United States Patent
Manico et al.

Patent Number: 5,892,995
Date of Patent: Apr. 6, 1999

[54] STEREOSCOPIC PICTURE-TAKING METHOD AND SYSTEM USING PRE-EXISTING IMAGES OF A SUBJECT

[75] Inventors: Joseph A. Manico; John A. Agostinelli, both of Rochester, N.Y.

[73] Assignee: Eastman Kodak Company, Rochester, N.Y.

[21] Appl. No.: 812,371

[22] Filed: Mar. 5, 1997

[51] Int. Cl.⁶ .................................................. G03B 35/00
[52] U.S. Cl. .............................................. 396/327; 355/22
[58] Field of Search ..................................... 396/154, 322, 396/324, 326, 327, 544, 661, 71; 355/22

[56] References Cited

U.S. PATENT DOCUMENTS

| | | |
|---|---|---|
| 1,485,956 | 3/1924 | Bredon . |
| 3,815,970 | 6/1974 | Murphy . |
| 4,994,832 | 2/1991 | Spector ................................. 396/322 |
| 5,189,453 | 2/1993 | Boyd . |
| 5,189,467 | 2/1993 | Wheeler ................................ 396/322 |
| 5,294,951 | 3/1994 | Lo . |
| 5,408,295 | 4/1995 | Hahm et al. ............................ 355/22 |
| 5,613,165 | 3/1997 | Dobbs et al. .......................... 396/322 |

Primary Examiner—David M. Gray
Attorney, Agent, or Firm—Roger A. Fields

[57] ABSTRACT

A stereoscopic picture-taking method comprises the steps of (1) positioning two image-bearing transparencies each having substantially the same positive image at separate right-position and left-position locations relative to one another; (2) projecting light through the right-positioned transparency first to a right-positioned taking lens of a camera and then to a right-positioned imaging area on a filmstrip in the camera, to expose a latent image on the right-positioned imaging area of the positive image on the right-positioned transparency; and (3) projecting light through the left-positioned transparency first to a left-positioned taking lens of the camera located to the left of the right-positioned taking lens and then to a left-positioned imaging area on the filmstrip located to the left of the right-positioned imaging area, to expose a latent image on the left-positioned imaging area of the positive image on the left-positioned transparency. Preferably, the positive image on the right-positioned transparency and the positive image on the left-positioned transparency are of a similar main subject shown in front of a similar background, with the main subject in the two transparencies being in at least slightly different locations relative to the background to appear to be viewed from at least slightly different perspectives when looking at the two transparencies.

9 Claims, 1 Drawing Sheet ns,995

STEREOSCOPIC PICTURE-TAKING METHOD AND SYSTEM USING PRE-EXISTING IMAGES OF A SUBJECT

FIELD OF THE INVENTION

The invention relates generally to the field of photography, and in particular to a stereoscopic picture-taking method and system. More specifically, the invention relates to a method and system that uses pre-existing images of a subject in order to obtain stereoscopic-matched latent images of the subject on a filmstrip in a single-use camera.

BACKGROUND OF THE INVENTION

A stereoscopic camera is ordinarily designed to take two photographs of the subject in front of it. The photographs are taken from viewpoints separated by substantially the same distance as a pair of normal human eyes. When the subsequent positive prints are looked at through a suitable stereoscopic viewer they combine to give a three-dimensional reproduction of the subject that was photographed.

Stereo cameras using 35 mm. film can take pairs of 24×30 mm. pictures which are separated on the filmstrip by one frame, i.e. one imaging area. The filmstrip is advanced one frame and three frames alternately by use of a special film transport.

Normal 35 mm. cameras making conventional full-frame 24×36 mm. exposures can also be used for stereo work with the aid of a stereo attachment accessory. This splits up the 24×36 mm. imaging area to produce two half-frame 18×24 mm. exposures forming a matched stereo pair. One way in which this is done is for the stereo attachment accessory to have a pair of spaced-apart frontal lenses which face the subject to be photographed and a pair of juxtaposed rear lenses located in front of the taking lens of the camera. Light rays reflected from the subject are received through the two frontal lenses, then reflected from a first pair of reflectors towards one another to a second pair of reflectors, and then reflected through the rear lenses to the taking lens and to respective half-frame imaging areas on the filmstrip. See prior art U.S. Pat. No. 3,815,970, issued Jun. 11, 1974.

A stereo camera that has three taking lenses for making three half-frame exposures is disclosed in prior art U.S. Pat. No. 5,294,951, issued Mar. 15, 1994. The two endmost lenses are separated from one another by substantially the same distance as a pair of normal human eyes.

Commonly assigned U.S. Pat. No. 5,189,453 issued Feb. 23, 1993 discloses a method and apparatus for pre-exposing the same image of a distinctive mark, figure or the like on one corner-portion of each full-frame imaging area on a filmstrip pre-loaded in a single-use camera. According to the disclosed method, diffuse light is first projected through an image-bearing transparency to the taking lens of the camera and then to a relatively small corner portion of respective imaging areas on the filmstrip. Thus, a latent image of the distinctive mark, figure or the like is exposed on one corner portion of each imaging area of the filmstrip without exposing the remainder of each imaging area. When the camera is subsequently used to take pictures, the exposures are made on the same imaging areas over the latent images that were pre-exposed on the filmstrip.

No suggestion is made in U.S. Pat. No. 5,189,453 to somehow use the disclosed method for stereoscopic picture-taking.

SUMMARY OF THE INVENTION

According to one aspect of the invention, a stereoscopic picture-taking method comprises the steps of:

positioning two image-bearing transparencies each having substantially the same positive image at separate right-position and left-position locations relative to one another;

projecting light through the right-positioned transparency first to a right-positioned taking lens of a camera and then to a right-positioned imaging area on a filmstrip in the camera, to expose a latent image on the right-positioned imaging area of the positive image on the right-positioned transparency; and projecting light through the left-positioned transparency first to a left-positioned taking lens of the camera located to the left of the right-positioned taking lens and then to a left-positioned imaging area on the filmstrip located to the left of the right-positioned imaging area, to expose a latent image on the left-positioned imaging area of the positive image on the left-positioned transparency. Preferably, the positive image on the right-positioned transparency and the positive image on the left-positioned transparency are of a similar main subject shown in front of a similar background, with the main subject in the two transparencies being in at least slightly different locations relative to the background to appear to be viewed from at least slightly different perspectives when looking at the two transparencies. Moreover, the positive image on the right-positioned and left-positioned transparencies are intended to reflect a particular type theme associated with sale of the camera. For example, the positive image might be of a football team, in which case the camera would be sold at a football game. In this instance, the camera would be sold with perhaps two adjoining imaging areas on a filmstrip in the camera, pre-exposed to reflect the positive image of the football team as seen on the right-positioned and left-positioned transparencies, and the remainder of the filmstrip would be exposed by the customer as he used the camera to take stereo pictures.

According to another aspect of the invention, a stereoscopic picture-taking system comprises:

two image-bearing transparencies each having substantially the same positive image and being positionable at separate right-position and left-position locations relative to one another, with the positive image on the right-positioned transparency and the positive image on the left-positioned transparency being of a similar main subject shown in front of a similar background, but the main subject in the two transparencies being in at least slightly different locations relative to the background to appear to be viewed from at least slightly different perspectives when looking at the right-positioned and left-positioned transparencies;

a camera having a right-positioned taking lens and a left-positioned taking lens;

a light source positioned to project light through the right-positioned transparency first to the right-positioned taking lens and then to a right-positioned imaging area on a filmstrip in the camera, to expose a latent image on the right-positioned imaging area of the positive image on the right-positioned transparency; and a light source positioned to project light through the left-positioned transparency first to the left-positioned taking lens and then to a left-positioned imaging area on the filmstrip located to the left of the right-positioned imaging area, to expose a latent image on the left-positioned imaging area of the positive image on the left-positioned transparency.

According to another aspect of the invention, a stereoscopic camera comprises:

at least two taking lenses; and an unexposed filmstrip except for at least two adjoining pre-exposed latent images of a similar main subject shown in front of a similar background, with the main subject in one of the latent images being in a location relative to the background that is at least slightly different than the location of the main subject relative to the background in the other latent image in order that the main subject in the two latent images appears to be viewed from at least slightly different perspectives.

DETAILED DESCRIPTION OF THE INVENTION

Figure 1:
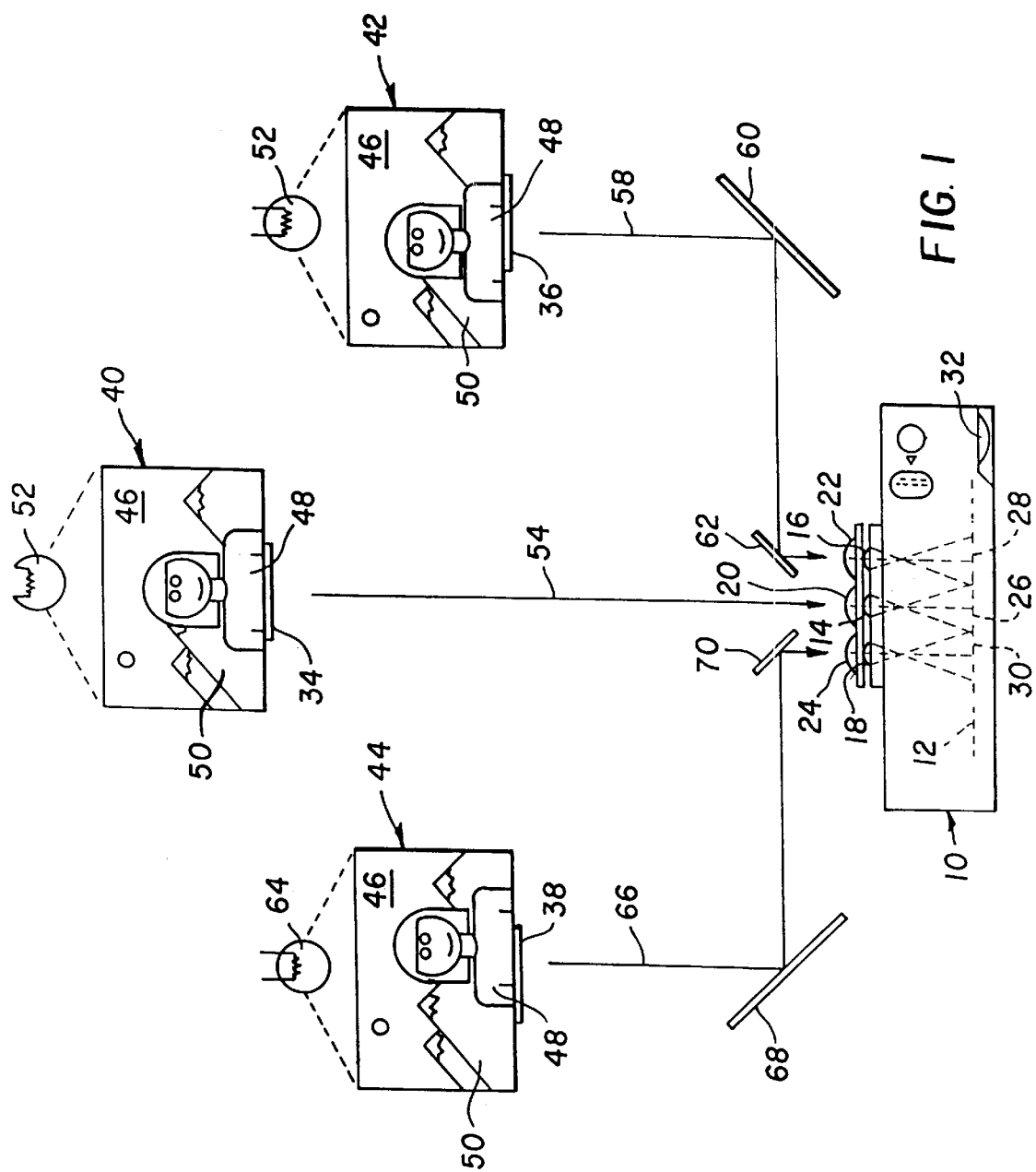
FIG. 1 is a schematic illustration of a stereoscopic picture-taking method and system using pre-existing images of a subject in order to obtain a stereoscopic-matched pair of latent images of the subject on a filmstrip in a single-use camera, pursuant to a preferred embodiment of the invention.

The invention is disclosed as being embodied preferably using a single-use camera. Because the features of a single-use camera are generally known, the description which follows is directed in particular only to those elements forming part of or cooperating directly with the disclosed embodiment. It is to be understood, however, that other elements may take various forms known to a person of ordinary skill in the art.

Referring now to the drawing, FIG. 1 shows a stereo single-use camera 10 in which a 35 mm. filmstrip 12 is stored originally on an unexposed film roll (not shown) except for a trailing film end portion which is secured to a take-up spool in a conventional 35 mm. film cartridge (not shown). The camera 10 has three side-by-side taking lenses 14, 16 and 18 fixed in the same plane. The taking lens 14 is a middle, i.e. center, taking lens. The taking lens 16 is a right taking lens located to the right of the middle taking lens 14 in FIG. 1. The taking lens 18 is a left taking lens located to the left of the middle taking lens 14 in FIG. 1. Respective auxiliary middle, right and left close-up lenses 20, 22 and 24 are located in front of the middle, right and left taking lenses 14, 16 and 18. Respective known shutters (not shown) are located behind the middle, right and left taking lenses 14, 16 and 18. During picture-taking, respective latent images of a subject being photographed are exposed simultaneously on adjoining middle, right and left imaging areas 26, 28 and 30 on the filmstrip 12 as depicted in FIG. 1. The three adjoining exposures on the filmstrip 12 are each full-frame. i.e. 24×36 mm, or alternatively can be half-frame, i.e. 18×24 mm. The right imaging area 28 is located to the right of the middle imaging area 26 in FIG. 1. The left imaging area 30 is located to the left of the middle imaging area 26 in FIG. 1. A manually rotatable thumbwheel 32 in coaxial engagement with the take-up spool in the film cartridge is rotated to wind the three adjoining exposures on the filmstrip 12 onto the take-up spool and to advance the next (unexposed) imaging areas on the filmstrip to behind the middle, right and left taking lenses 14, 16 and 18.

Respective supports 34, 36 and 38 are provided for positioning three image-bearing transparencies 40, 42 and 44 each having substantially the same positive image 46 at separate middle, right-of-middle and left-of-middle locations relative to one another as shown in FIG. 1. The positive image 46 on the middle transparency 40 is of a main subject 48, e.g. a female, shown centered relative to a background 50, e.g. three mountains. The positive image 46 on the right transparency 42 is of the main subject 48 shown at least slightly to the left-of-center relative to the background 50. The positive image 46 on the left transparency 44 is of the main subject 48 shown at least slightly to the right-of-center relative to the background 50. Thus, in FIG. 1, the main subject 46 in the three transparencies 40, 42 and 44 is at slightly different locations relative to the background 50 to appear to be viewed from at least slightly different perspectives when looking at the three transparencies.

A light source 52 is positioned to project light through the middle transparency 40, along a direct non-deviating path 54, first to the middle close-up and taking lenses 20 and 14 and then to the middle imaging area 26, to expose a latent image on the middle imaging area of the positive image 46 on the middle transparency. A light source 56 is positioned to project light through the right transparency 42, along an indirect deviating path 58 effected by a pair of mutually angled reflectors 60 and 62, first to the right close-up and taking lenses 22 and 16 and then to the right imaging area 28, to expose a latent image on the right imaging area of the positive image 46 on the right transparency. A light source 64 is positioned to project light through the left transparency 44, along an indirect deviating path 66 effected by a pair of mutually angled reflectors 68 and 70, first to the left close-up and taking lenses 24 and 18 and then to the left imaging area 30, to expose a latent image on the left imaging area of the positive image 46 on the left transparency. Preferably, the direct non-deviating path 54, and the indirect deviating paths 58 and 66 are substantially the same length. The support 34 for the middle transparency 40 is positioned farther from the middle taking lens 14 than the supports 36 and 38 for the right and left transparencies 42 and 44 are positioned from the right and left taking lenses 16 and 18. This is because the direct non-deviating path 54 is not folded as in the case of the indirect non-deviating paths 58 and 66.

The three latent images on the middle, right and left imaging areas 26, 28 and 30 of the positive image 46 on the middle, right and left transparencies 40, 42 and 44 are intended to reflect a particular type theme associated with sale of the camera 10. For example, the positive image 46 might be of a football team, in which case the camera 10 would be sold at a football game. In this instance, the camera 10 would be sold with respective images of the football team pre-exposed on the three imaging areas 26, 28 and 30 on the filmstrip 12 in the camera and the remainder of the filmstrip would be exposed by the customer as he used the camera to take stereo pictures. The camera 10 would be sold with the pre-exposed imaging areas 26, 28 and 30 wound onto the take-up spool in the film cartridge and the next (unexposed) imaging areas on the filmstrip 12 advanced to behind the middle, right and left taking lenses 14, 16 and 18.

The invention has been described with reference to a preferred embodiment. However, it will be appreciated that variations and modifications can be effected by a person of ordinary skill in the art without departing from the scope of the invention. For example, instead of the middle, right and left transparencies 40, 42 and 44, only two transparencies, i.e. a right one and a left one, may be used. In that case, the positive image on the right transparency and the positive image on the left transparency would be of a similar main subject shown in front of a similar background, with the main subject in the two transparencies being in at least slightly different locations relative to the background to appear to be viewed from at least slightly different perspectives when looking at the two transparencies.

PARTS LIST 10. single-use camera
12. filmstrip
14. middle taking lens
16. right taking lens
18. left taking lens
20. middle close-up lens
22. right close-up lens
24. left close-up lens
26. middle imaging area
28. right imaging area
30. left imaging area
32. thumbwheel
34. support
36. support
38. support
40. middle image-bearing transparency
42. right image-bearing transparency
44. left image-bearing transparency
46. positive image
48. main subject
50. background
52. light source
54. direct non-deviating path
56. light source
58. indirect deviating path
60. reflector
62. reflector
64. light source
66. indirect deviating path
68. reflector
70. reflector

What is claimed is:

1. A stereoscopic picture-taking method comprising the steps of:

providing a pair of image-bearing transparencies each having a similar main subject shown in front of a similar background, with the main subject in the two transparencies being in at least slightly different locations relative to the background to appear to be viewed from at least slightly different perspectives when looking at the two transparencies;

positioning the two image-bearing transparencies at separate right-position and left-position locations relative to one another;

projecting light through the right-positioned transparency first to a right-positioned taking lens of a camera and then to a right-positioned imaging area on a filmstrip in the camera, to expose a latent image on the right-positioned imaging area of the positive image on the right-positioned transparency; and projecting light through the left-positioned transparency first to a left-positioned taking lens of the camera located to the left of the right-positioned taking lens and then to a left-positioned imaging area on the filmstrip located to the left of the right-positioned imaging area, to expose a latent image on the left-positioned imaging area of the positive image on the left-positioned transparency.

2. A stereoscopic picture-taking method comprising the steps of:

providing a trio of image-bearing transparencies each having a similar main subject shown in front of a similar background, with the main subject in the three transparencies being in at least slightly different locations relative to the background to appear to be viewed from at least slightly different perspectives when looking at the two transparencies;

positioning the three image-bearing transparencies at separate middle, right-of-middle and left-of-middle locations relative to one another;

projecting light through the middle transparency first to a middle taking lens of a camera and then to a middle imaging area on a filmstrip in the camera, to expose a latent image on the middle imaging area of the positive image on the middle transparency;

projecting light through the right transparency first to a right taking lens of the camera located to the right of the middle taking lens and then to a right imaging area on the filmstrip located to the right of the middle imaging area, to expose a latent image on the right imaging area of the positive image on the right transparency; and projecting light through the left transparency first to a left taking lens of the camera located to the left of the middle taking lens and then to a left imaging area on the filmstrip located to the left of the middle imaging area, to expose a latent image on the left imaging area of the positive image on the left transparency.

3. A stereoscopic picture-taking method as recited in claim 2, wherein light projected through the middle, right and left transparencies is projected to the whole of the middle, right and left imaging areas to provide full-frame exposures of the positive image on those imaging areas.

4. A stereoscopic picture-taking method as recited in claim 2, wherein light projected through the middle, right and left transparencies is projected simultaneously to the middle, right and left imaging areas to expose the latent images of the positive image on those imaging areas at the same time.

5. A stereoscopic picture-taking method as recited in claim 2, wherein light projected through the middle, right and left transparencies is projected through respective auxiliary close-up lenses located in front of the middle, right and left taking lenses.

6. A stereoscopic picture-taking method as recited in claim 2, wherein light projected through the right and left transparencies to the right and left taking lenses is projected along respective indirect deviating paths, and light projected through the middle transparency to the middle taking lens is projected along a direct non-deviating path.

7. A stereoscopic picture-taking method as recited in claim 6, wherein the middle transparency is positioned farther from the middle taking lens than the right and left transparencies are positioned from the right and left taking lenses.

8. A stereoscopic picture-taking method as recited in claim 2, wherein the positive image on the middle transparency is of a main subject shown centered relative to a background, the positive image on the right transparency is of the main subject shown at least slightly to the left-of-center relative to the background, and the positive image on the left transparency is of the main subject shown at least slightly to the right-of-center relative to the background.

9. A method of pre-conditioning a stereoscopic camera for a user of the camera, comprising the steps of:

pre-exposing an unexposed filmstrip to provide at least two adjoining latent images of a similar main subject shown in front of a similar background, with the main subject in one of the pre-exposed latent images being in a location relative to the background that is at least slightly different than the location of the main subject relative to the background in the other pre-exposed latent image in order that the main subject in the two pre-exposed latent images appears to be viewed from at least slightly different perspectives; and advancing the unexposed filmstrip to position at least two adjoining unexposed imaging areas on the filmstrip behind respective taking lenses in the camera.

* * * * *